United States Patent [19]

Iimura

[11] 4,138,507

[45] Feb. 6, 1979

[54] COAGULATED EGG-WHITE FOODSTUFFS

[75] Inventor: Okinori Iimura, Tama, Japan

[73] Assignee: Kewpie Kabushiki Kaisha, Tokyo, Japan

[21] Appl. No.: 742,502

[22] Filed: Nov. 16, 1976

[30] Foreign Application Priority Data

Jul. 5, 1976 [JP] Japan ................................. 52-79587

[51] Int. Cl.$^2$ .............................................. A23L 1/32
[52] U.S. Cl. ..................................... 426/614; 426/657
[58] Field of Search ......................... 426/613, 614, 657

[56] References Cited

U.S. PATENT DOCUMENTS

| | | | |
|---|---|---|---|
| 2,052,028 | 8/1936 | Harris et al. | 426/614 |
| 2,901,360 | 8/1959 | Gorman et al. | 426/614 |
| 3,510,315 | 5/1970 | Hawley | 426/614 |
| 3,565,638 | 2/1971 | Ziegler et al. | 426/614 |
| 3,640,731 | 2/1972 | Kaplow | 426/614 |
| 3,843,811 | 10/1974 | Seeley | 426/614 |
| 3,917,873 | 11/1975 | Kuroda et al. | 426/614 |
| 3,974,296 | 8/1976 | Burkwall | 426/657 |

*Primary Examiner*—Jeanette M. Hunter
*Attorney, Agent, or Firm*—Oblon, Fisher, Spivak, McClelland & Maier

[57] ABSTRACT

Coagulated egg-white foodstuffs comprising coagulated egg-white, a water-combinable material, a viscosity increasing agent, a starch hydrolyzate. These foodstuffs exhibit little or no water separation with no occurrence of a significant increase in hardness when they are thawed after storage thereof in a frozen state, and at the same time, the thawed foodstuffs have excellent palatability.

10 Claims, No Drawings

COAGULATED EGG-WHITE FOODSTUFFS

BACKGROUND OF THE INVENTION

The present invention relates to coagulated eggwhite food-stuffs. More specifically, it is concerned with a process for producing coagulated egg-white foodstuffs having excellent thawing property.

Coagulated egg-white foodstuffs prepared by heat coagulation of egg-white liquid is disadvantageous in that the water contained in the foodstuffs is separated and exuded and the structure of the egg white becomes spongy, impairing the palatability of the foodstuffs when the foodstuffs are thawed after storage thereof in a frozen state. As one approach to overcome these difficulties, there is known a method wherein a so-called water combinable material such as starch is incorporated into an egg-white liquid (for example, as disclosed in the specification of U.S. Pat. No. 3,510,315). My studies reveal, however, that the addition of a small quantity of the water-combinable material cannot provide the desired result, while a greater quantity of the material causes the coagulated egg white to be very hard, whereby the palatability thereof is remarkably impaired, although the water separation may be inhibited to some degree.

As a result of my study to develop coagulated egg-white foodstuffs which exhibit further decreased water separation during the thawing thereof, I have found that, in addition to the water-combinable material, the addition of a viscosity increasing agent into the egg-white is useful for obtaining such foodstuffs. I have also found that, in addition to the water-combinable material and the viscosity increasing agent, the addition of a starch hydrolyzate into the egg white not only results in further increased inhibition of the water separation during the thawing of the egg white without increasing the hardness of the egg white but also provides a final coagulated egg white product having the same smooth structure, after thawing, as that of a coagulated egg white before it is frozen. The present invention is based on these findings.

SUMMARY OF THE INVENTION

According to this invention, briefly summarized, there is provided a coagulated egg-white foodstuff comprising coagulated egg white, a water-combinable material and a viscosity increasing agent.

According to this invention, there is further provided a coagulated egg-white foodstuff comprising coagulated egg white, a water-combinable material, a viscosity increasing agent, and a starch hydrolyzate.

DETAILED DESCRIPTION

An egg-white liquid usable for the production of the coagulated egg white according to the present invention is one which is ordinarily obtained by breaking a shelled raw egg and separating the white from the yolk. The egg-white liquid may be an egg-white liquid obtained by thawing frozen egg white or a solution of a dried egg white in water. Examples of eggs usable for the present invention are eggs of domestic chicken hens, quails, ducks and geese. The egg of a chicken hen is particularly preferred.

Examples of the water-combinable materials usable for the present invention are carbohydrates such as cereal powders, starch, and other edible powder compositions which are capable of absorbing and combining with water due to their polymer structure. Individual examples of the carbohydrate are corn starch, rice starch, potato starch, and wheat flour. Denatured starches may also be used. Further, as the water-combinable material, any of marine colloidal materials such as algin, agar-agar, or carrageenan may be used. Among these materials, starches are particularly advantageous in the practice of this invention.

The quantity of water-combinable material added is in the range of 1 to 15% by weight with respect to the total starting materials. Particularly, in order to avoid a significant hardness of the thawed product, the water-combinable material should be preferably added in a quantity of not greater than 10% by weight. In the case where the water-combinable material is a marine colloidal material, it is desirable that its addition quantity be not greater than about 3% by weight because larger quantities give rise to a deterioration of the texture inherent in the egg-white in the final product.

The viscosity increasing agent as used herein designates those materials which provide a remarkable increase in viscosity with a small quantity of addition. Examples of such material are gummy materials such as guar gum, tragacanth gum, xanthane gum, and tamarind gum and carboxymethyl cellulose.

The quantity of the above mentioned viscosity increasing agent added may vary depending on the type of the viscosity increasing agent used. Ordinarily, for the guar gum, xanthane gum, and tragacanth gum, the addition quantity is in the range of about 0.1 to 1.0% by weight, preferably 0.2 to 0.7% by weight, with respect to the total starting materials. When the viscosity increasing agent is added in a quantity less than about 0.1% by weight, the desired result is difficult to attain. On the other hand, in the case where the viscosity increasing agent is added in a quantity greater than 1.0% by weight, the egg white liquid becomes to viscous, rendering the handling thereof inconvenient.

As the starch hydrolyzate, use may be made of a partially hydrolyzed product of dextrin. Derivatives of dextrin such as dextrin alcohol may also be used. Particularly, a dextrin alcohol may be advantageously used. In the case where the starch hydrolyzate is a dextrin, it is desirable that the hydrolyzate have a D.E. value of about 5 to about 25, particularly about 7 to about 22. When the D.E. value is less than about 5, the desired result is difficult to attain. On the other hand, in the case where the D.E. value is greater than about 25, the resulting product becomes sweet, and, thus, the higher D.E. values are undesirable. The dextrin alcohol preferably has an average degree of polymerization of about 12.

The quantity of the starch hydrolyzate added is in the range of 2 to 15% by weight, particularly 2.5 to 10% by weight, with respect to the total starting materials. When the quantity of the starch hydrolyzate is less than 2% by weight, the desired result is difficult to attain. On the other hand, in the case where the quantity of the starch hydrolyzate exceeds 10% by weight, the palatability inherent in the egg-white is liable to deteriorate.

The coagulated egg-white foodstuffs according to the present invention may be prepared, for example, by adding the water combinable material, the viscosity increasing agent and, if desired, the starch hydrolyzate to the above mentioned egg-white liquid, mixing these materials together, introducing the resulting mixture into a container of any suitable shape and heating the mixture to coagulate it. Alternatively, the above mentioned egg-white mixture may be placed in a layer around the outer periphery of a coagulated yolk in the form of a rod to coagulate the resulting composite by heating thereby to produce a hard-boiled egg in the form of a rod.

In the production of the coagulated egg-white foodstuffs, heating is carried out under a condition such that the coagulation of the egg-white will be attained. Ordinarily, heating at a temperature of 80 to 100° C. for a period of about 15 to 25 minutes is satisfactory. Furthermore, any additives other than the water combinable material, viscosity increasing agent and starch hydrolyzate, for example, table salt and other condiments may be added, if necessary. In this case, the other additives should be desirably added in a quantity such that they cause no hardening of the egg-white. In order that the resulting product retain the characteristics as an egg-white food, it is desirable that the egg-white liquid constitute at least about 70% by weight of the total raw materials.

The coagulated egg-white foodstuffs obtained according to the present invention when thawed after frozen storage exhibit far less water separation than conventional coagulated egg-white foods. Ordinarily, little water separation is observable in the thawed coagulated egg-white foods of the present invention. Further, if the coagulated egg-white foods of the present invention contain particularly the starch hydrolyzate, they exhibit little or no water separation with no attendance of a substantial increase in the hardness of the coagulated egg-white, and at the same time develop an appearance of fine structure and possesses a smooth palatability.

EXAMPLE 1

To each of a number of samples of egg-white liquid obtained from the breakage of raw chicken hen eggs were added the additives indicated in the following Table, and the resulting mixtures were respectively charged into tubular bags made of polyethylene of a diameter of 38 mm in a quantity of 200 g per bag, after which each bag was closed by tying it with a cord. Then, the bag was heated in hot water at a temperature of 98° C. for 20 minutes to coagulate the content contained therein. The coagulated egg-white food thus obtained was frozen in a chamber at a temperature of −22 to −23° C. and stored therein for 14 days.

At the end of this period, the frozen food was thawed at room temperature, and the thawed food was measured for hardness and quantity in gram of separated water. The appearance of the thawed food was also observed. The results are shown in Table 1.

The hardness was measured by using a rheometer (manufactured by Sanwa Riken Company) with a sensitivity of x 1 up under a load of 1 kg. With respect to the data thus determined, a larger numerical value represents a harder product. The quantity of the separated water was determined in the following manner. The thawed food was cut into round slices each having a thickness of 20 mm and a diameter of 38 mm, and each slice was pressed to a thickness of 10 mm. After the pressing operation, the quantity of the exuded water was determined. An average value of five measurements is shown in Table 1. The dextrin used had a D.E. value of 12, and the dextrin alcohol used had an average degree of polymerization of 12.

Table 1

| | Quantity of additive | | | | Property | |
|---|---|---|---|---|---|---|
| | Water combinable material wt.% | Viscosity increasing agent wt.% | Starch hydrolyzate wt.% | Hardness | Quantity of separated water (g) | Appearance |
| Control Example 1 (before freezing) | — | — | — | 8 | 0 | fine structure |
| Control Example 2 (after freezing) | — | — | — | 10 | 5.9 | coarse structure |
| | corn starch 2 | — | — | 19 | 4.6 | coarse structure |
| Comparison Example 1 | 5 | — | — | 21 | 4.5 | " |
| | 8 | — | — | 22 | 4.4 | rough palatability |
| | 11 | — | — | 31 | 4.3 | " |
| | 14 | — | — | 48 | 2.7 | " |
| | agar-agar 0.5 | — | — | 15 | 5.8 | coarse structure |
| Comparison Example 2 | 1 | — | — | 16 | 5.5 | " |
| | 3 | — | — | 18 | 4.5 | blackened |
| | 5 | — | — | 24 | 3.0 | " |
| | corn starch 0.5 | guar gum 0.2 | — | 10 | 4.4 | slightly coarse structure |
| | 2 | 0.2 | — | 12 | 3.5 | " |
| This invention | 5 | 0.2 | — | 14 | 1.8 | " |
| | 8 | 0.2 | — | 24 | 1.5 | " |
| | 11 | 0.2 | — | 38 | 1.3 | " |
| | 14 | 0.2 | — | 58 | 1.2 | " |
| | 16 | 0.2 | — | 65 | 1.0 | " |
| | corn starch 4 | guar gum 0.2 | dextrin alcohol 2.5 | 12 | 1.8 | fine structure |
| This invention | 4 | 0.2 | 5 | 11 | 1.6 | " |
| | 4 | 0.2 | 7.5 | 11 | 0.5 | " |
| | 4 | 0.2 | 10 | 10 | 0.4 | " |
| | corn starch 6 | guar gum 0.2 | dextrin alcohol 2.5 | 14 | 1.0 | " |
| This invention | 6 | 0.2 | 5 | 13 | 0.5 | " |
| | 6 | 0.2 | 7.5 | 15 | 0.2 | " |
| | 6 | 0.2 | 10 | 12 | 0.0 | " |
| | corn starch 8 | guar gum 0.2 | dextrin alcohol 0.2 | 19 | 0.4 | fine structure |
| This invention | 8 | 0.2 | 5 | 17 | 0.3 | " |
| | 8 | 0.2 | 7.5 | 16 | 0.0 | " |
| | 8 | 0.2 | 10 | 17 | 0.0 | " |
| | corn starch 4 | guar gum 4 | dextrin 2.5 | 13 | 1.6 | slightly fine structure |

Table 1-continued

| | Quantity of additive | | | Property | | |
|---|---|---|---|---|---|---|
| | Water combinable material wt.% | Viscosity increasing agent wt.% | Starch hydrolyzate wt.% | Hardness | Quantity of separated water (g) | Appearance |
| This invention | | | 0.2 | 5 | 13 | 0.8 | " |
| | 4 | 0.2 | 7.5 | 15 | 0.2 | " |
| | 4 | 0.2 | 10 | 17 | 0.0 | " |
| | corn starch 6 | guar gum 0.2 | dextrin 2.5 | 16 | 1.2 | " |
| This invention | 6 | 0.2 | 5 | 16 | 0.6 | " |
| | 6 | 0.2 | 7.5 | 17 | 0.1 | " |
| | 6 | 0.2 | 10 | 16 | 0.0 | " |
| | corn starch 8 | guar gum 0.2 | dextrin 2.5 | 22 | 1.0 | slightly fine structure |
| This invention | 8 | 0.2 | 5 | 22 | 0.5 | " |
| | 8 | 0.2 | 7.5 | 22 | 0.0 | " |
| | 8 | 0.2 | 10 | 22 | 0.0 | " |

It is apparent from Table 1 that the process of the present invention can reduce the water separation to a greater extent than the conventional processes, and that the present process can smooth the structure of the coagulated egg white after thawing and reduce the water separation without increasing the hardness of the coagulated egg white.

EXAMPLE 2

To each of a number of samples of egg-white liquid obtained from the breakage of raw chicken hen eggs were added wheat flour and tragacanth gum in the quantities indicated in Table 2, and the respective mixtures were thoroughly stirred and coagulated by heating them in the same manner as in Example 1. The quantities of the wheat flour and tragacanth gum were calculated on the basis of the total quantity of the starting raw materials including the wheat flour and tragacanth gum.

By the same procedures as those described in Example 1, the coagulated food was frozen, stored, and thawed. The thawed food was measured for hardness and water separation. The results are shown in Table 2.

Table 2

| Wheat flour wt.% | Tragacanth gum wt.% | Hardness | Quantity of separated water g | Appearance |
|---|---|---|---|---|
| 0.5 | 0.4 | 10 | 4.3 | coarse structure |
| 7 | 0.05 | 22 | 4.0 | " |
| 7 | 0.4 | 23 | 1.5 | slightly coarse structure |
| 7 | 1.5 | 30 | 1.2 | sticky due to the gum |
| 15 | 0.4 | 63 | 1.0 | slightly fine structure |

EXAMPLE 3

To each of a number of samples of egg-white liquid obtained from the breakage of raw chicken hen eggs were added agar-agar, tragacanth gum and a dextrin (having a D.E. value of 22) in respective quantities as indicated in Table 3, and the respective mixtures were thoroughly stirred and coagulated by heating them in the same manner as in Example 1. The quantities of the agar-agar, tragacanth gum and dextrin were calculated on the basis of the total quantity of the starting raw materials including all these materials.

By the same procedures as those described in Example 1, the coagulated food was frozen, stored, and thawed. The thawed food was measured for hardness and water separation. The results are shown in Table 3.

Table 3

| Agar-agar wt. % | Tragacanth gum wt. % | Dextrin wt. % | Hardness | Quantity of separated water g | Appearance |
|---|---|---|---|---|---|
| 1 | 0.3 | 0.5 | 13 | 5.5 | coarse structure |
| 1 | 0.3 | 8 | 15 | 2.0 | slightly coarse structure |
| 1 | 0.3 | 17 | 20 | 1.3 | taste characteristic of dextrin |

EXAMPLE 4

To each of a number of samples of egg-white liquid obtained from the breakage of raw chicken hen eggs were added rice flour, xanthane gum and a dextrin alcohol (having an average degree of polymerization of 12) in the quantities indicated in Table 4, and the respective mixtures were thoroughly stirred and coagulated by heating them in the same manner as in Example 1. The quantities of the rice flour, xanthane gum, and dextrin alcohol were calculated on the basis of the total quantity of the starting raw materials including all these materials.

By the same procedures as those described in Example 1, the coagulated product was frozen, stored, and thawed. The thawed product was measured for hardness and water separation. The results are shown in Table 4.

Table 4

| Rice flour wt. % | Xanthane gum wt. % | Dextrin alcohol wt. % | Hardness | Quantity of separated water g | Appearance |
|---|---|---|---|---|---|
| 10 | 0.2 | 0.1 | 14 | 4.0 | coarse structure |
| 10 | 0.2 | 7 | 18 | 0.2 | fine structure |
| 10 | 0.2 | 10 | 20 | 0 | slightly strong sweetness |

EXAMPLE 5

Raw chicken hen eggs were broken and separated into the yolk and the egg-white liquid. The yolk was heated and coagulated into a rod having a diameter of 20 mm. The resulting rod was introduced as a core into a bag made of polyethylene which had a diameter of 35 mm. Then, the egg-white liquid with wheat flour, tragacanth gum, and a dextrin alcohol (having an average degree of polymerization of 12) added thereto was introduced around the outer surface of the core. The quantities of the wheat flour, tragacanth gum, and dextrin alcohol were 6%, 0.3%, and 7%, all by weight, respectively, based on the total starting raw materials except for the yolk. Then, the bag was tied at its two ends and heated at a temperature of 95° C. for 20 minutes to coagulate the egg-white liquid. A hard-boiled egg in the form of a rod was obtained.

I claim:

1. A freeze-thaw stable, heat coagulated, frozen egg white food product consisting essentially of at least about 70% by weight of a coagulated egg white, 1 to 15% by weight of a water-combinable material, about 0.1 to 1.0% by weight of a viscosity increasing agent, and 2 to 15% by weight of a starch hydrolyzate, said each ingredient being based on the total raw materials.

2. The food product of claim 1 wherein the coagulated egg white is obtained by coagulating the egg-white liquid from a chicken egg.

3. The food product of claim 1 wherein the water-combinable material is a member selected from the group consisting of corn starch, agar-agar, wheat flour, and rice flour.

4. The food product of claim 1 wherein the viscosity increasing agent is a member selected from the group consisting of guar gum, tragacanth gum, and xanthane gum.

5. The food product of claim 1 wherein the starch hydrolyzate is a member selected from the group consisting of dextrin alcohols and dextrine.

6. The food product of claim 1 wherein the water-combinable material is in the range of 1 to 10% by weight with respect to the total raw materials.

7. The food product of claim 1 wherein the viscosity increasing agent is in the range of 0.2 to 0.7% by weight with respect to the total raw materials.

8. The food product of claim 1 wherein the starch hydrolyzate is in the range of 2.5 to 10% by weight with respect to the total raw materials.

9. The food product of claim 5 wherein the dextrin alcohols have the degree of polymerization of 12.

10. The food product of claim 5 wherein the dextrins have a D.E. value of 5 to 25.

* * * * *